United States Patent
Nasser et al.

(10) Patent No.: US 11,416,490 B2
(45) Date of Patent: Aug. 16, 2022

(54) PRIORITIZATION AND OPTIMIZATION OF DATABASE WORKLOADS

(71) Applicant: International Business Machines Corporation, Armonk, NY (US)

(72) Inventors: Samir Nasser, Durham, NC (US); Brian M. O'Connell, Cary, NC (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/983,001

(22) Filed: Aug. 3, 2020

(65) Prior Publication Data

US 2022/0035816 A1 Feb. 3, 2022

(51) Int. Cl.
G06F 16/24 (2019.01)
G06F 16/2453 (2019.01)
G06F 16/2455 (2019.01)

(52) U.S. Cl.
CPC .... G06F 16/24549 (2019.01); G06F 16/2455 (2019.01)

(58) Field of Classification Search
CPC .......... G06F 16/24549; G06F 16/2455; G06F 16/2453
See application file for complete search history.

(56) References Cited

U.S. PATENT DOCUMENTS

| | | | |
|---|---|---|---|
| 6,985,904 B1 | 1/2006 | Kaluskar et al. | |
| 7,567,968 B2 | 7/2009 | Desai et al. | |
| 8,527,473 B1 | 9/2013 | Brown et al. | |
| 10,095,742 B2 | 10/2018 | Duan et al. | |
| 2004/0186829 A1* | 9/2004 | Suzuki | G06F 16/24532 |
| 2005/0097083 A1* | 5/2005 | Barsness | G06F 16/24539 |
| 2006/0036989 A1* | 2/2006 | Chaudhuri | G06F 16/22 717/101 |
| 2007/0299814 A1* | 12/2007 | Barsness | G06F 16/2453 |

(Continued)

OTHER PUBLICATIONS

Farnan et al., "PAQO: Preference-Aware Query Optimization for Decentralized Database Systems", Department of Computer Science, University of Pittsburgh, Department of Computer Science, North Carolina State University, 12 pages, 2014. http://people.cs.pitt.edu/~nlf4/pubs/C14a.pdf.

(Continued)

*Primary Examiner* — Alicia M Willoughby
(74) *Attorney, Agent, or Firm* — Daniel M. Yeates (57) ABSTRACT

A computer-implemented method groups queries to reduce performance degradation. The method includes, receiving, by a database manager, a set of queries from one or more requestors, wherein each query of the set of queries includes an access plan. The method includes, determining, based at least on the access plan of each query, that a first query in the set of queries is incompatible with a second query of the set of queries. The method includes, grouping, in response to the first query and the second query being incompatible, the first query in a first group, and the second query in a second group, wherein the first group and the second group are included in a set of groups. The method includes, determining an order for each group of the set of groups. The method further includes, executing, in response to determining the order, each group in the determined order.

17 Claims, 5 Drawing Sheets

(56) References Cited

U.S. PATENT DOCUMENTS

| | | | |
|---|---|---|---|
| 2009/0077001 A1 | 3/2009 | Macready et al. | |
| 2009/0138448 A1* | 5/2009 | Barsness | G06F 16/2454 |
| 2009/0319475 A1* | 12/2009 | Bestgen | G06F 16/2453 |
| 2010/0318495 A1* | 12/2010 | Yan | G06F 16/27 |
| | | | 707/618 |
| 2010/0318559 A1* | 12/2010 | Yan | G06F 16/2471 |
| | | | 707/769 |
| 2011/0320410 A1* | 12/2011 | Marum | G06F 16/24534 |
| | | | 707/687 |
| 2014/0156633 A1* | 6/2014 | Duan | G06F 16/2453 |
| | | | 707/713 |
| 2014/0156636 A1 | 6/2014 | Bellamkonda et al. | |
| 2016/0246841 A1* | 8/2016 | Pesala | G06F 16/9535 |
| 2017/0316055 A1 | 11/2017 | Chen et al. | |
| 2017/0344605 A1* | 11/2017 | Wells | G06F 16/2453 |
| 2018/0121426 A1* | 5/2018 | Barsness | G06F 9/5011 |
| 2021/0124764 A1* | 4/2021 | Kaul | G06F 16/23 |

OTHER PUBLICATIONS

Fritchey, "SQL Server 2012 Query Performance Tuning", Chapter 16, Database Workload Optimization, Copyright Grant Fritchey, 2012, 32 pages.

Giannikisi et al., "Shared Workload Optimization", Proceedings of the VLDB Endowment, vol. 7, No. 6 Copyright 2014 VLDB Endowment 2150-8097/14/02, 12 pages.

Mell et al., "The NIST Definition of Cloud Computing", Recommendations of the National Institute of Standards and Technology, Special Publication 800-145, Sep. 2011, 7 pages.

\* cited by examiner

PRIORITIZATION AND OPTIMIZATION OF DATABASE WORKLOADS

BACKGROUND

The present disclosure relates to database management, and, more specifically, to grouping queries to increase database performance.

Executing database queries may involve scanning thousands of entries from multiple tables to identify requested data while properly managing/displaying/returning the data to a requestor. An access plan is generated and optimized for each query. The access plan represents a series of steps (commands) that will be performed in a specific order to identify and return the requested data. The optimizing is based on system statistics and represents a guess at the most efficient method to complete the query. The completed access plan is executed, and the results retuned to the requestor.

SUMMARY

Disclosed is a computer-implemented method to group queries to reduce performance degradation. The method includes, receiving, by a database manager, a set of queries from one or more requestors, wherein each query of the set of queries includes an access plan. The method also includes, determining, based at least on the access plan of each query, that a first query in the set of queries is incompatible with a second query of the set of queries. The method further includes, grouping, in response to the first query and the second query being incompatible, the first query in a first group, and the second query in a second group, wherein the first group and the second group are included in a set of groups. The method includes, determining an order for each group of the set of groups. The method further includes, executing, in response to determining the order, each group in the determined order.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Structured query language (SQL) is a database management language used in relational databases. SQL queries may include a variety of commands such as search, scan, join, etc. Generally, several queries execute concurrently. This concurrency can lead to a degradation in performance for one or more of the queries.

In order to better prioritize and optimize database workloads, embodiments of the present disclosure may group queries into one or more groups such that no query in the group will negatively affect the processing of any other query in the same group. Additionally, embodiments of the present disclosure determine an order to process the groups to increase the overall efficiency of processing the database system.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
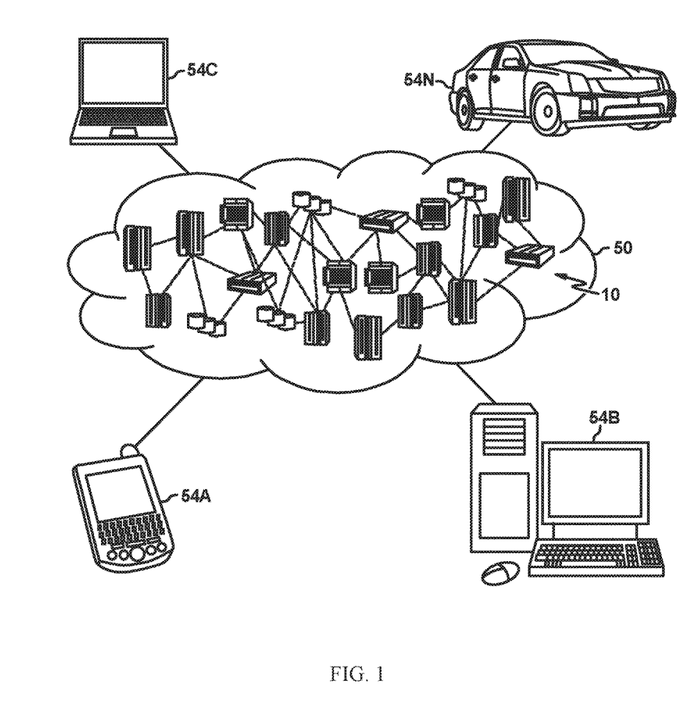
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
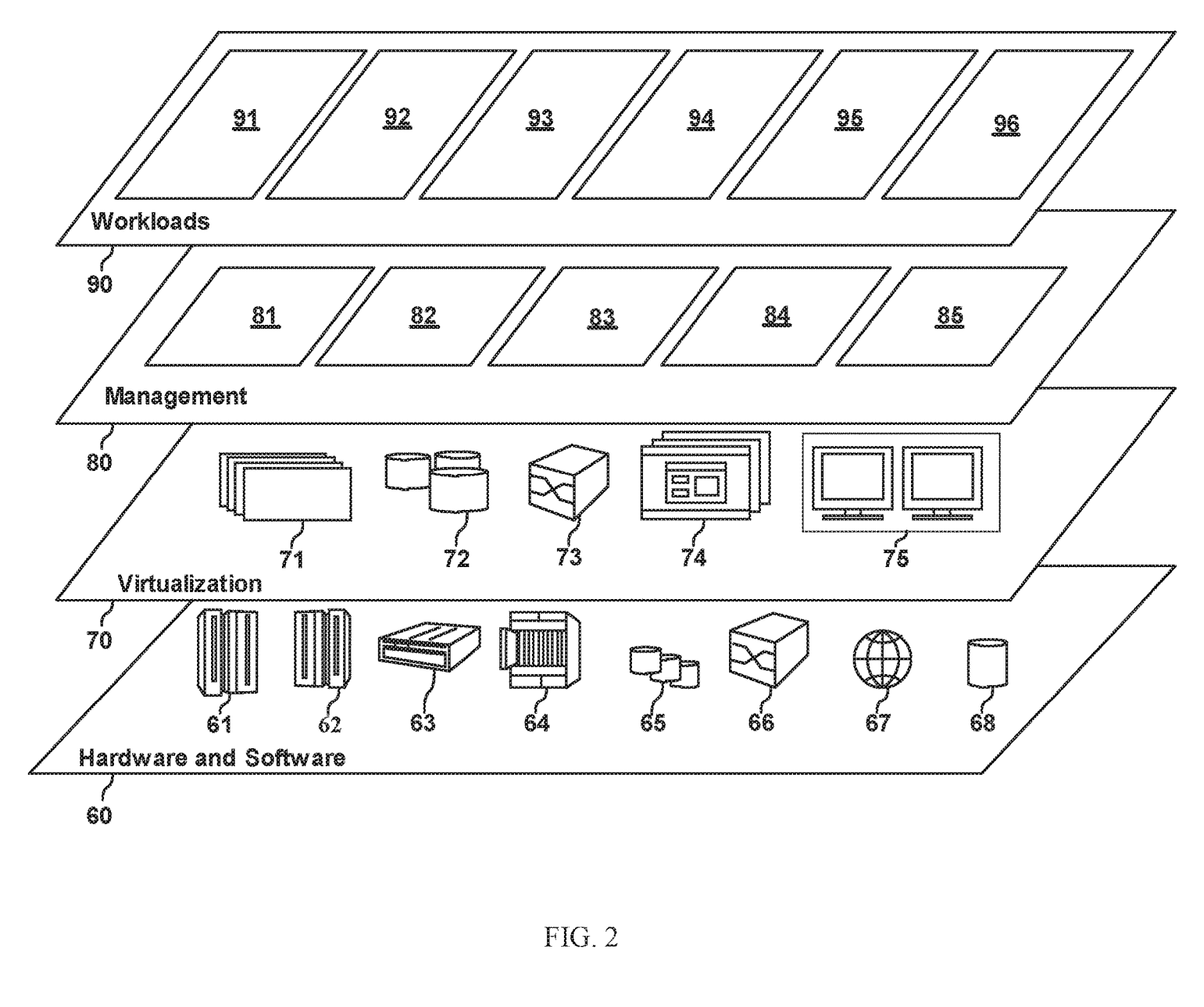
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query grouping 96.

Data Processing System in General

Figure 3:
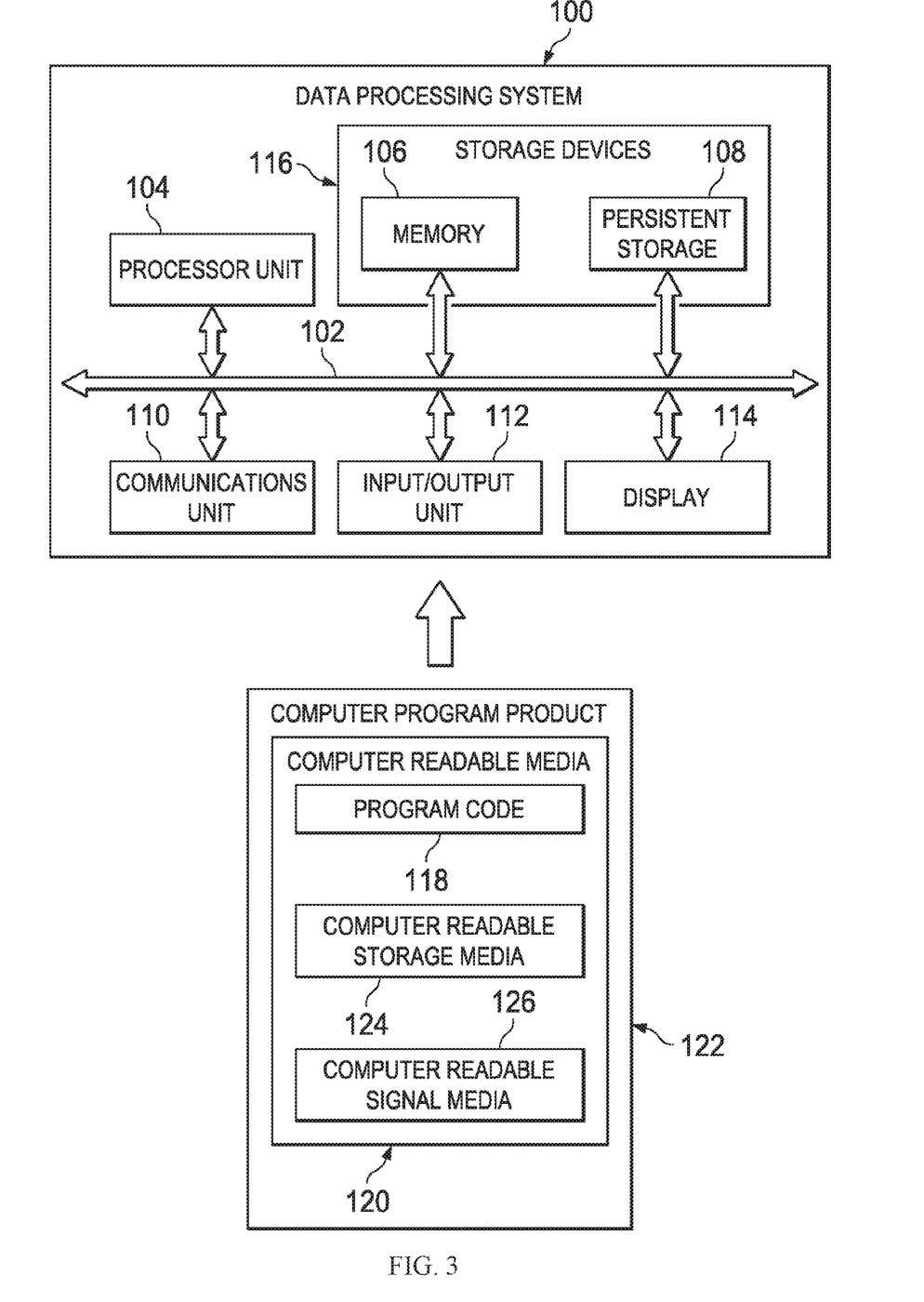
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Prioritizing Database Workloads

Executing database queries may involve scanning thousands of entries from multiple tables to identify requested data while properly managing/displaying/returning the data to a requestor. An access plan is generated and optimized for each query. The access plan represents a series of steps (commands) that will be performed in a specific order to identify, sort, and return the data to a requestor. The optimizing is based on system statistics and represents a guess at the most efficient method to complete the query.

Database systems may receive multiple queries from multiple sources. Many of these queries may be executed/processed concurrently. However, this concurrency can lead to a degradation in performance for one or more of the queries. The performance degradation may be an increase in execution time, a reduction of query throughput, and/or other similar efficiency losses. For example, a first query may lock a table for a period of time. If a second query needs to access the table, it may wait until the first query unlocks the table. The database system may be processing thousands of queries from multiple requestors. A single query that experiences a slight performance degradation may have a small effect on the overall efficiency of the database. However, if that same small degradation is repeated thousands of times an hour, that may lead to a significant efficiency loss. Therefore, even small inefficiencies may be compounded based on the high volume of queries processed by a database system. Thus, embodiments of the present disclosure seek to reduce these inefficiencies.

Embodiments of the present disclosure are configured to organize queries into groups for processing to eliminate or reduce performance degradation. In some embodiments, incoming queries are grouped such that any query in a group will not degrade performance of a different query in the same group if the queries are execute simultaneously. For purposes of this disclosure, when a first query will negatively affect the performance of a second query, the two queries are considered incompatible. The groupings may be based on query similarity, query complexity, query importance (priority), source of the query, and/or other similar factors. In some embodiments, historical data, ranking rules/data, and or database metadata may be used to group the queries.

In some embodiments, the groups are prioritized. Higher priority groups may be given preference to be executed over lower priority groups. The prioritization may be based on source, priority, contextual importance, historical data, holding time (e.g., time since the queries were received for processing) and/or other similar factors.

In some embodiments, a single group is executed at a time. During execution, multiple queries may be processes in parallel. In some embodiments, multiple groups are processed in parallel. However, the groups will be configured to not interfere with the other group being processed.

The aforementioned advantages are examples of advantages, and embodiments exist that can contain all, some, or none of the aforementioned advantages while remaining within the spirit and scope of the present disclosure.

Figure 4:
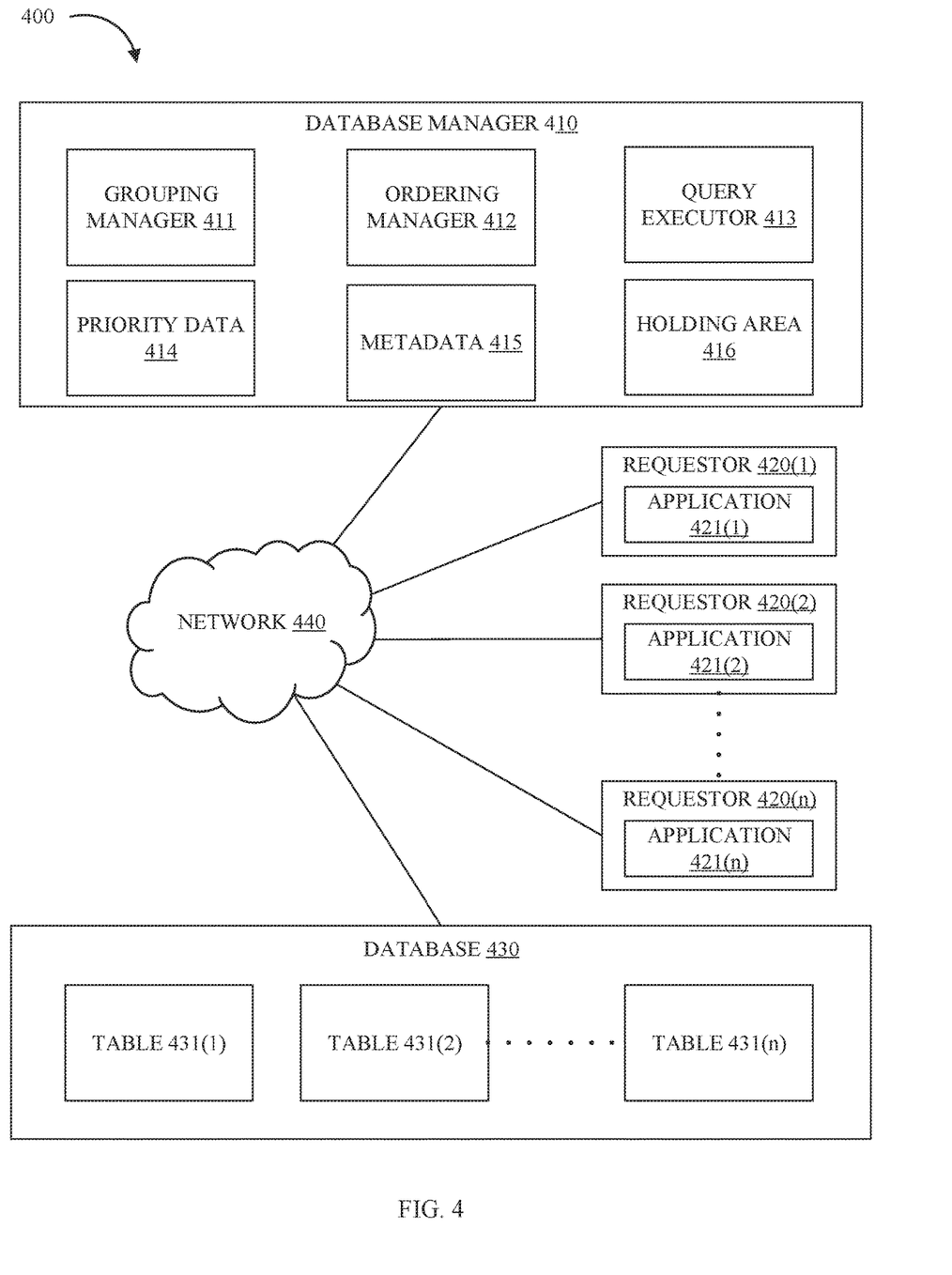
FIG. 4 illustrates a functional diagram of a computing environment suitable for operation of a database manager, in accordance with some embodiments of the present disclosure.

Referring now to various embodiments of the disclosure in more detail, FIG. 4 is a representation of a computing environment 400, that is capable of running a database manager (e.g., database manager 410) in accordance with one or more embodiments of the present disclosure. Many modifications to the depicted environment may be made by those skilled in the art without departing from the scope of the disclosure.

Computing environment 400 includes database manager 410, requestor 420(1) through requestor 420(n) (where "n" is any integer that enables operation of the computing environment 400 as described herein), database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between database manager 410, requestor 420(1) through requestor 420(n), database 430 and other computing devices (not shown) within computing environment 400. In some embodiments, database manager 410, requestor 420(1) through requestor 420(n), and database 430 may include a computer system, such as the data processing system 100.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system. A federated database system can transparently map multiple autonomous database systems into a single integrated database. In some embodiments, a federated database system acts as a virtual database, where there is no actual data integration in the constituent databases.

In some embodiments, database manager 410 receives one or more queries. The query may be any format configured to retrieve data from a database. In some embodiments, the query is a standard query language (SQL) query. Each query includes an access plan. The access plan indicates a series of steps to complete the query. In some embodiments, database manager 410 includes grouping manager 411, ordering manager 412, query executor 413, priority data 414, metadata 415, and holding area 416.

Grouping manager 411 includes any combination of hardware and/or software configured to organize queries into groups. In some embodiments, each group is configured such that execution of a query in the group will not negatively affect the execution of a different query in the same group. Two or more queries that negatively affect execution of each other are considered incompatible. Queries that have no negative effect are considered compatible. In various embodiments, the groupings may be based on one or more of source of the query, the complexity of the query, one or more targets of the query, logical proximity (or logical distance) to other queries, historical usage of the query, contextual importance, and other similar factors. In some embodiments, each group includes at least one group criteria. Each query in the group will satisfy/meet the group criteria.

In some embodiments, grouping manager 411, dynamically generates groups. At various times, grouping manager 411 maintains a varying number of groups. Each group may be identified by a number and/or based on characteristics of the group. If a certain group processes each query, the group may be removed. Alternatively, if a query is received that does not fit into an existing group, a new group may be created.

In some embodiments, each group includes a fixed number of queries. Once the fixed number is determined, the group is sent for processing. The size of a group may be different for each group. But, once the group is sent, no additional queries may be added to the group.

In some embodiments, grouping manager generates a predefined set of groups. Each group of the set of groups is differentiated based on one or more factors. As each query is received, grouping manager 411 assigns the query into one of the groups. The factors may include, source (e.g., requestor 420(2)), complexity, target (e.g., table 431(1)), size (e.g., memory usage), predicted execution time, and/or other similar factors. For example, if a first query and a second query are both known to use a large amount of a limited resource such as temporary table space (or memory), if run concurrently, the two queries may exhaust (or exceed) the allocated temporary table space. As a result, the performance of one or both queries may suffer due the limited temporary space.

Ordering manager 412 can be any combination of hardware and/or software configured to prioritize queries/groups. Generally, higher priority groups will be processed before lower priority groups. In some embodiments, ordering manager 412 determines an order of groups for processing. The order may be based on the same or different factors than used for grouping.

In some embodiments, the group priority is based on historical data. The historical usage may be related to one or more of the requestor (e.g., a customer, or an application), a query type, and a contextual importance. For example, data received with a query (e.g., a flag) may indicate an importance that exceeds the standard importance. Ordering manager 412 may give the group containing a flagged query a higher priority. In some embodiments, the historical data includes processing time and/or resource consumption. For example, if a group of queries are known to have a relatively short processing time and/or utilize a relatively low amount of resources, the group may be given higher priority allowing a large number of queries to be proceed and removed from holding area 416.

In some embodiments, a ranking system is used to prioritize the groups. Each group will be ranked higher or lower than any other group. In some embodiments, the group priority is based on a priority score. The priority score may be calculated by ordering manager 412. Each group can be assigned a score based on the group characteristics, the higher the score, the higher the priority. Each factor will contribute to the overall group score. In some embodiments, the priority score is dynamic. For example, if the current number of groups is a factor in the priority score, the score may change in response to a group being closed (deleted), or a new group being created. Another example includes the priority score for a group may increase with the time since the queries in the group were received by database manager 410.

Query executor 413 can be any combination of hardware and/or software configured to execute (or process) the queries that enables operation of computing environment 400 as described herein. In some embodiments, query executor 413 processes the groups based the results of ordering manager 412. In some embodiments, the highest priority groups are executed before lower priority groups.

Query executor 413 may retrieve the queries from holding area 416, then return the results to the requestor. In some embodiments, query executor 413 records metadata for each processed query. The metadata may be recorded in metadata 415.

Priority data 414 can be a set of data used to prioritize groups. In some embodiments, priority data 414 includes predefined rules that indicate how to order/prioritize the groups. In some embodiments, priority data 414 includes predefined rules. The rules may be input/generated by a user, generated by grouping manager 411, ordering manager 412, and/or other components of database manager 410. For example, one rule could be each group containing a query with a certain priority flag will be given the highest priority. Another rule may be that no query may be held beyond a predetermined period of time. In some embodiments, priority data 414 dictates how to assign points/ranking to each group based on the group characteristics. For example, groups with queries from requestor 420(3) should be ranked higher than queries from requestor 420(2).

Metadata 415 (or metadata/or database data) can comprise information related to previously completed queries on database 430. In some embodiments, metadata 415 includes database statistics. In some embodiments, metadata 415 includes historical data. The historical data may include, for each query/group, and without limitation, the source, size, processing time, complexity, and other similar data. In some embodiments, the historical data is maintained/evaluated based on a predefined temporal period.

Holding area 416 can be any combination of hardware and/or software configured to store groups of queries for processing that enables operation of computing environment 400 as described herein. In some embodiments, holding area 416 includes an allocated memory space in or more storage modules. The groups/queries are sent from holding area 416 to query executor 413 to be processed.

Requestor 420(1), requestor 420(2), through requestor 420(n), where n is an integer, may be referred to as requestors 420 in combination or representatively. Requestors 420 can be a standalone computing device, a management server, a web server, a mobile computing device, or any other electronic device or computing system capable of receiving, sending, and processing data. In other embodiments, requestor 420 can represent a server computing system utilizing multiple computers as a server system, such as in a cloud computing environment. In some embodiments, requestor 420 is configured to generate a database query, and receive the results. The query may be sent to database manager 410 and/or database 430. In some embodiments, each requestor 420 includes an application 421. In some embodiments, requestors 420 include two or more applications.

Application 421(1), application 421(2), through application 421(n), where n is an integer, may be referred to as application 421 collectively or representatively. Application 421 can be any combination of hardware and/or software that is configured to generate a query. A query can be a request for data and/or information stored in one more tables (or other data structures) of or more databases. The databases may be local or remote (e.g., database 430). In some embodiments, application 420 sends the query to database manager 410. In some embodiments, application 420 is included in database manager 410.

Database 430 can be any combination of hardware and/or software configured to store data in a database system. In some embodiments, database 430 is part of a federated database system. In some embodiments, database 430 includes two or more databases communicatively connected. In some embodiments, database 430 may be contained within host 405.

In some embodiments, database 430 includes table 431(1), table 431(2), through table 431(n), where n is an integer, may be referred as table 431 in combination or representatively. In some embodiments, each table 431 has one or more associated indices. The index may represent the location of various data contained in table 431.

Figure 5:
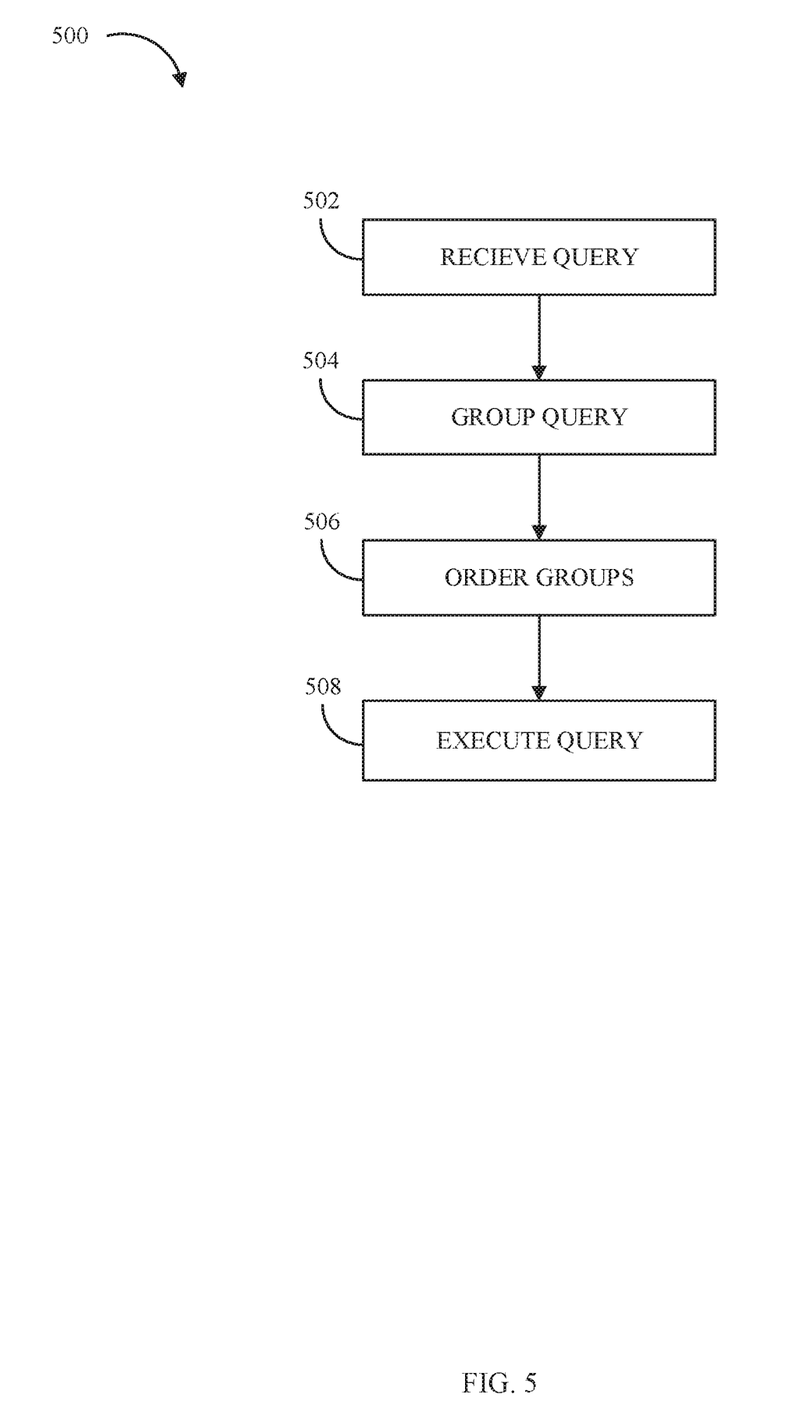
FIG. 5 illustrates a flow chart of an example method to group and order queries, in accordance with some embodiments of the present disclosure.

FIG. 5 depicts a flowchart of an example method 500, for prioritizing optimizing database workloads that can be performed in a computing environment (e.g., computing environment 400 and/or cloud computing environment 50). One or more of the advantages and improvements described above for generating and monitoring usage patterns may be realized by method 500, consistent with various embodiments of the present disclosure.

Method 500 can be implemented by one or more processors, database manager 410, the subcomponents of database manager 410, and/or a different combination of hardware and/or software. In various embodiments, the various operations of method 500 are performed by one or more of database manager 410, the subcomponents of database manager 410, requestor 420, and/or database 430. For illustrative purposes, the method 500 will be described as being performed by database manager 410.

At operation 502, database manager 410 receives a query. In some embodiments, the query is received from requestor 420. The received query may include an optimized access plan. The access plan indicates how to properly execute the query, tables to be accessed, relative computing costs, and other similar data. In some embodiments, a plurality of queries are received. The queries may be received as a batch (e.g., from a batch application), or they may be received individually (e.g., from a web application).

In some embodiments, the received query includes one or more flags (or indicators). The indicators may be used to identify a source (e.g., requestor 420(2) or application 421(2)), a priority indicator, and/or other instructions.

At operation 504, database manager 410 groups the queries. In some embodiments, the queries are grouped such that no query in a group will negatively affect performance of a different query in the same group. In some embodiments, grouping manager 411 groups the queries. In some embodiments, the grouping is based on the access plans. The access plan for each query indicates which tables will be used and the approximate computing resources needed to execute the query. For example, if a first query and a second query both need to lock a first table, then the second query may be put on hold until the first query unlocks the table. The execution time of the second query would be unnecessarily increased. As a result, grouping manager 411 may place the first query and the second query in different groups.

In some embodiments, grouping is based on previously executed queries. In some embodiments, previously executed query data is stored in metadata 415. For example, if a first query and a second query had previously been grouped together, and the result was performance degradation, then grouping manager 411 may place the two queries into different groups. In some embodiments, the grouping is based on a query's logical proximity to other grouped queries and/or previous queries. In some embodiments, the grouping is based on the frequency at which the query (or a similar query) is received. In some embodiments, the grouping is based on priority.

In some embodiments, grouping manager 411 dynamically creates groups. Each query is analyzed and placed in a group. However, if adding the query to any of the current groups may negatively affect another query, grouping manager 411 may create a new group. Once all the queries in the group are processed, the group may be deleted. The number of current groups may be different.

In some embodiments, grouping manager 411 maintains a set of predefined groups. Each group includes a set of factors that define when a query fits in that particular group. When a query is received, grouping manager 411 determines, based on the query characteristics, the appropriate group. The number of groups may remain constant, Also, a group may include zero queries at a particular time.

At operation 506, database manager 410 determines an order to execute the groups. In some embodiments, ordering manager 412 determines the order to execute the groups. In some embodiments, the order is based on the groups' contents. In some embodiments, the order is based on priority of the queries in the group. In some embodiments, priority is based on the source. This may include queries from a common requestor or application. Each source may include a priority score. In some embodiments, the ordering is based on a contextual priority. Contextual priority is an indication that a specific query should be treated with higher or lower priority than the standard priority for that query. A flag or other indicator may be received with the query to indicate contextual priority. Generally, ordering manager 412 orders higher priority groups above lower priority groups.

In some embodiments, the order is based on a time the queries were received. The longer the time the queries have been in the group, the higher the group priority. This may prevent a low priority group from being indefinitely held when a large number of higher priority queries are received. In some embodiments, the priority of a group increases with the amount of time the queries are held in the group.

In some embodiments, the ordering is based on the frequency of the query and/or the frequency of receiving queries from requestor 420. Higher usage of a query (or similar queries) and receiving that query from multiple sources, may result in a higher priority than a lower usage query or a query with limited or a single source. The frequency may be obtained from metadata 415. In some embodiments, operation 406 includes sending the groups to holding area 416.

In some embodiments, the ordering is based on a predefined set of rules (or policy). The policy may be stored in priority data 414. In some embodiments, priority data 414 can be changed. The rules may indicate how to determine group priority. For example, a rule could dictate that overall priority of a group is based on the priority of a single query in the group. This could be the highest priority, the lowest priority, or a median priority, or the overall priority is based on the average of all priorities. Another rule many indicate that queries from a first source should always have a higher priority than queries from a second source.

At operation 508, database manager 410 executes the queries. In some embodiments, query executor 413 is used to execute the queries. The group may be retrieved from holding area 416. In some embodiments, query executor 413 selects group to execute based on the order determined in operation 506. In some embodiments, operation 508 includes returning the executed query to the source (e.g., requestor 420(1)). In some embodiments, operation 508 includes recording data related to the query in metadata 415.

In some embodiments, grouping manager 411, ordering manager 412, and query executor 413 continuously and dynamically perform the operations of FIG. 500. For example, assume a first query from a first group with a relatively low priority is being executed. The execution involves locking a first table. A second query is received, and it is placed in a second group, because it has a high priority is ordered at the top and should be executed immediately. Query executor 413, will freeze processing the first query, including unlocking the first table, process the second query, then resume processing the first table.

Computer Technology and Computer Readable Media

The present disclosure may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for grouping queries, comprising:
   receiving, by a database manager, a set of queries from one or more requestors, wherein each query of the set of queries includes an access plan;
   determining, based on at least the access plan of each query, that a first query in the set of queries is incompatible with a second query of the set of queries, wherein the determining the first query is incompatible with the second query further comprises predicting a negative effect on the second query subject to processing the first query and the second query simultaneously;
   grouping, in response to the first query and the second query being incompatible, the first query in a first group, and the second query in a second group, wherein the first group and the second group are included in a set of groups, and each group of the set of groups includes different queries;
   determining an order to execute each group of the set of groups; and
   executing, in response to determining the order, each group in the determined order wherein all queries in each group are processed in parallel.

2. The method of claim 1, wherein the first query blocks access to a set of data, and the negative effect comprises a blocked request to access the set of data by the second query.

3. The method of claim 1, wherein the first query utilizes a first amount of an allocated memory, the second query utilizes a second amount of the allocated memory, and the negative effect comprises the first amount and the second amount exhausting the allocated memory.

4. The method of claim 1, wherein the order is based on a priority of at least one query in each group.

5. The method of claim 1, further comprising:
   determining a third query from the set of queries is compatible with the first query;
   grouping the third query in the first group; and
   wherein executing each group in the determining order further comprises:
      processing the first query and the third query simultaneously.

6. The method of claim 1, wherein determining the first query and the second query are incompatible is based on a set of previously executed queries.

7. The method of claim 1, wherein the first group and the second group are created in response to determining the first query and the second query are incompatible.

8. The method of claim 7, wherein executing each group further comprising:
   deleting the first group in response to executing the first query in the first group.

9. The method of claim 1, further comprising:
   defining, the set of groups, including the first group and the second group, wherein each group includes at least one group characteristic; and
   wherein receiving the set of queries is in response to defining the set of groups.

10. A system comprising:
    a processor; and
    a computer-readable storage medium communicatively coupled to the processor and storing program instructions which, when executed by the processor, are configured to cause the processor to:
       receive, by a database manager, a set of queries from one or more requestors, wherein each query of the set of queries includes an access plan;
       determine, based on at least the access plan of each query, that a first query in the set of queries is incompatible with a second query of the set of queries, wherein the determination the first query is incompatible with the second query further comprises predicting a negative effect on the second query subject to processing the first query and the second query simultaneously;
       group, in response to the first query and the second query being incompatible, the first query in a first group, and the second query in a second group, wherein the first group and the second group are included in a set of groups, and each group of the set of groups includes different queries;
       determine, an order to execute each group of the set of groups, wherein the order; and
       execute, in response to the determined order for each group, each group in the determined order, wherein all queries in each group are processed in parallel.

11. The system of claim 10, wherein the first query blocks access to a set of data, and the negative effect comprises a blocked request to access the set of data by the second query.

12. The system of claim 10, wherein the first query utilizes a first amount of an allocated memory, the second query utilizes a second amount of the allocated memory, and the negative effect comprises the first amount and the second amount exhausting the allocated memory.

13. The system of claim 10, wherein the program instructions are further configured to cause the processor to:
    define the set of groups, including the first group and the second group, wherein each group includes at least one group characteristic; and
    wherein receiving the set of queries is in response to defining the set of groups.

14. A computer program product, the computer program product comprising a computer readable storage medium having program instructions embodied therewith, the program instructions executable by a processing unit to cause the processing unit to:
    receive, by a database manager, a set of queries from one or more requestors, wherein each query of the set of queries includes an access plan;
    determine, based on at least the access plan of each query, that a first query in the set of queries is incompatible with a second query of the set of queries, wherein the determination the first query is incompatible with the second query further comprises predicting a negative effect on the second query subject to processing the first query and the second query simultaneously;
    group, in response to the first query and the second query being incompatible, the first query in a first group, and the second query in a second group, wherein the first group and the second group are included in a set of groups, and each group of the set of groups includes different queries;
determine, an order to execute each group of the set of groups, wherein the order;
execute, in response to the determined order for each group, each group in the determined order, wherein all queries in each group are processed in parallel.

15. The computer program product of claim 14, wherein the first query blocks access to a set of data, and the negative effect comprises a blocked request to access the set of data by the second query.

16. The computer program product of claim 14, wherein the first query utilizes a first amount of an allocated memory, the second query utilizes a second amount of the allocated memory, and the negative effect comprises the first amount and the second amount exhausting the allocated memory.

17. The computer program product of claim 14, wherein the program instructions are further configured to cause the processing unit to:
define the set of groups, including the first group and the second group, wherein each group includes at least one group characteristic; and
wherein receiving the set of queries is in response to defining the set of groups.

* * * * *